(12) United States Patent
Yoshida

(10) Patent No.: US 10,714,038 B2
(45) Date of Patent: Jul. 14, 2020

(54) DISPLAY DEVICE

(71) Applicant: SHARP KABUSHIKI KAISHA, Sakai, Osaka (JP)

(72) Inventor: Keisuke Yoshida, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 16/159,614

(22) Filed: Oct. 13, 2018

(65) Prior Publication Data
US 2019/0114981 A1    Apr. 18, 2019

(30) Foreign Application Priority Data

Oct. 13, 2017 (JP) ................. 2017-199094

(51) Int. Cl.
*G09G 3/36* (2006.01)
*G02F 1/1335* (2006.01)
*G02F 1/133* (2006.01)
*G02F 1/1362* (2006.01)

(52) U.S. Cl.
CPC ....... *G09G 3/3648* (2013.01); *G02F 1/13306* (2013.01); *G02F 1/133512* (2013.01); *G02F 1/136286* (2013.01); *G09G 2310/0264* (2013.01)

(58) Field of Classification Search
CPC .......... G02F 1/13306; G02F 1/133512; G02F 1/136286; G09G 3/3648; G09G 2310/0264
See application file for complete search history.

(56) References Cited

U.S. PATENT DOCUMENTS

| | | | | |
|---|---|---|---|---|
| 10,176,775 | B2 * | 1/2019 | Lee | ............ G11C 19/00 |
| 2015/0293546 | A1 * | 10/2015 | Tanaka | ............ G02F 1/136227 |
| | | | | 327/541 |
| 2019/0114955 | A1 * | 4/2019 | Yamamoto | ............ G09G 3/2003 |

FOREIGN PATENT DOCUMENTS

| | | |
|---|---|---|
| JP | H07-318902 A | 12/1995 |
| JP | H08-062581 A | 3/1996 |

* cited by examiner

*Primary Examiner* — Nelson M Rosario
(74) *Attorney, Agent, or Firm* — ScienBiziP, P.C.

(57) ABSTRACT

A display device has an active matrix substrate including: a plurality of gate lines; a plurality of sub-gate lines provided to each of the gate lines, the sub-gate lines extends in a direction intersecting at right angles with a direction of the gate lines extending; first driving circuitry provided in a frame area and scanning the gate lines; a second driving circuitry provided in the frame area and scanning the sub-gate lines, where each of the sub-gate lines is connected with the gate line in a display area, the first driving circuitry supplies a scanning signal to each of the gate lines via both ends of the gate line, and the second driving circuitry includes n driving circuits supplying the scanning signal to each of the sub-gate lines, via at least one end of the sub-gate line.

8 Claims, 9 Drawing Sheets

DISPLAY DEVICE

TECHNICAL FIELD

The present invention relates to a display device.

BACKGROUND ART

Patent Documents 1 and 2 indicated below disclose a technique for driving gate lines in a liquid crystal display device with use of scanning circuits provided at ends on both sides of the gate lines. The two scanning circuits arranged at ends on both sides of the gate lines operate in synchronization, and supply a scanning signal to the gate lines simultaneously. By supplying the scanning signal to the gate lines from the both ends, it is unlikely that the scanning signal would become dull, as compared with a case where the scanning signal is supplied from one end side.

PRIOR ART DOCUMENT

Patent Document

Patent Document 1: JP-A-7-318902
Patent Document 2: JP-A-8-62581

SUMMARY OF THE INVENTION

Problem to be Solved by the Invention

In recent years, display devices have larger sizes, and enhanced image definition. In line with this trend, higher speed driving of gate lines is demanded. In a case of such a display device, even if a scanning signal is supplied to the gate line from both ends thereof, the scanning signal tends to become dull in the vicinity of the center part of the gate line.

If the scanning signal becomes dull when a gate line is selected, an appropriate scanning voltage is not applied to the gate line, whereby defects occur to the writing with respect to the pixels. If the scanning signal becomes dull when the gate line is switched to a non-selected state, defects occur to the writing to the pixels corresponding to the gate line; for example, data for pixels of a gate line on the stage next to the foregoing gate line are written in the pixels.

As a display device has a larger size and higher image definition, gate lines become longer, and the number of data lines that intersect with the gate lines increases. This causes a scanning signal to become dull, and tends to cause scanning signal delays.

The present invention provides a technique that enables high-speed driving of gate lines even in a large-size high-definition display device.

Means to Solve the Problem

A display device according to one embodiment of the present invention is a display device that includes an active matrix substrate, wherein the active matrix substrate includes: a plurality of gate lines; a plurality of sub-gate lines that are provided in such a manner that one or more sub-gate lines are provided with respect to each of the gate lines, the sub-gate lines extending in a direction that intersects at right angles with a direction in which the gate lines extend; first driving circuitry that is provided in a frame area and scans the gate lines; and a second driving circuitry that is provided in the frame area and scans the sub-gate lines, wherein each of the sub-gate lines is connected with the gate line corresponding thereto in a display area, the first driving circuitry supplies a scanning signal to each of the gate lines via both ends of the gate line, and the second driving circuitry includes n driving circuits (n is a natural number) that supply the scanning signal to each of the sub-gate lines, via at least one end of the sub-gate line.

Effect of the Invention

With the present invention, high-speed driving of gate lines is enabled even in a large-size high-definition display device.

MODE FOR CARRYING OUT THE INVENTION

Figure 1:
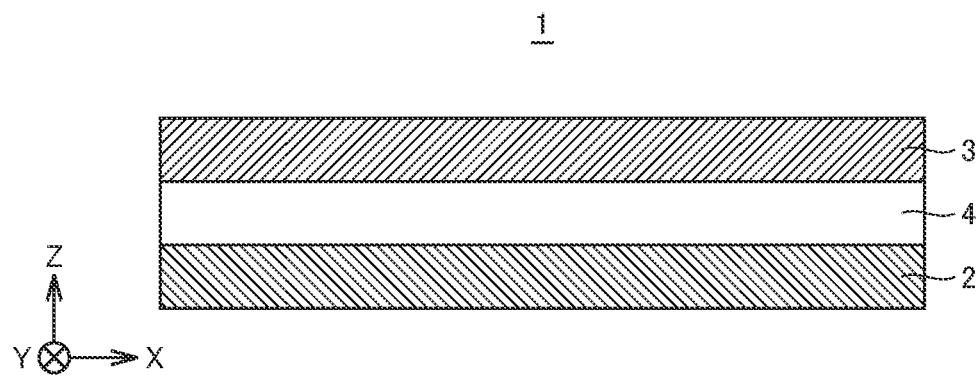
FIG. 1 is a schematic cross-sectional view of a display device in Embodiment 1.

A display device according to one embodiment of the present invention is a display device that includes an active matrix substrate, wherein the active matrix substrate includes: a plurality of gate lines; a plurality of sub-gate lines that are provided in such a manner that one or more sub-gate lines are provided with respect to each of the gate lines, the sub-gate lines extending in a direction that intersects at right angles with a direction in which the gate lines extend; first driving circuitry that is provided in a frame area and scan the gate lines; and a second driving circuitry that is provided in the frame area and scans the sub-gate lines, wherein each of the sub-gate lines is connected with the gate line corresponding thereto in a display area, the first driving circuitry supplies a scanning signal to each of the gate lines via both ends of the gate line, and the second driving circuitry includes n driving circuits (n is a natural number) that supply the scanning signal to each of the sub-gate lines, via at least one end of the sub-gate line (the first configuration).

According to the first configuration, the active matrix substrate includes at least one sub-gate line per each gate line, the sub-gate line intersecting at right angles with a direction in which the gate lines extend. The sub-gate lines are connected with the corresponding gate lines within the display area. To the gate lines, the scanning signal is supplied via ends thereof on both sides. To the sub-gate lines, the scanning signal is supplied via at least ends on one side. In other words, to the gate lines, the scanning signal is transmitted not only via the ends on both sides, but also via the sub-gate lines. As compared with a case where no sub-gate line is provided, therefore, it is not likely that delays would occur to the scanning signal transmitted to the gate lines, resulting in that high-speed driving of the gate lines is realized. Besides, since the scanning signal is supplied via the sub-gate lines to the gate lines, the reliability of the scanning of the gate lines can be enhanced.

The first configuration may be further characterized in that the sub-gate lines are arrayed in the direction in which the gate lines extend so as to be line-symmetric with respect to a position that is approximately the center in a length of the gate lines (the second configuration).

According to the second configuration, the sub-gate lines can be arranged line-symmetrically with respect to the approximate center of the gate lines. As compared with a case where the sub-gate lines are arrayed unevenly so that more of the same are present on one side of the gate lines, it is therefore possible to further prevent scanning signal delays from occurring in the gate lines.

The first configuration may be further characterized in that the plurality of sub-gate lines include a plurality of sub-gate lines of a first sub-gate line group and a plurality of sub-gate lines of a second sub-gate line group, each of the gate lines is connected with the sub-gate lines in such a manner that each gate line is connected with one of the sub-gate lines of the first sub-gate line group, and with one of the sub-gate lines of the second sub-gate line group, within the display area, the second driving circuitry supplies the scanning signal to each sub-gate line in the first sub-gate line group and the second sub-gate line group, via at least an end thereof on one side, and the first sub-gate line group and the second sub-gate line group are arranged extending along the direction in which the gate lines extend, so as to be line-symmetric with respect to a position that is approximately center in a length of the gate lines (the third configuration).

According to the third configuration, the gate lines are connected with the sub-gate lines of two groups, i.e., the first sub-gate line group and the second sub-gate line group, within the display area. To each gate line of the first sub-gate line group and the second sub-gate line group, the scanning signal is supplied. The first sub-gate line group and the second sub-gate line group are arranged so as to be line-symmetric with respect to a position that is approximately center of the gate lines. In other words, to each gate line, the scanning signal is supplied via the ends thereof on both sides, and via portions thereof that are connected with the two sub-gate lines belonging to the first sub-gate line group and the second sub-gate line group. As compared with a case where the gate line is connected with one sub-gate line, it is therefore not likely that delays would occur to the scanning signal transmitted to the gate line, resulting in that high-speed driving of the gate lines is realized.

Any one of the first to third configurations may be further characterized in that the n is 2; the second driving circuitry includes a first driving circuit and a second driving circuit, the first driving circuit and the second driving circuit corresponding to each of the sub-gate lines; the first driving circuit supplies the scanning signal to each corresponding sub-gate line via one end thereof; and the second driving circuit supplies the scanning signal to each corresponding sub-gate line via the other end thereof (the fourth configuration).

According to the fourth configuration, the scanning signal is supplied via ends on both sides of the sub-gate lines. As compared with a case where the scanning signal is supplied via ends on one side of the sub-gate lines, it is therefore not likely that delays would occur to the scanning signal in the sub-gate lines, resulting in that the scanning signal can be transmitted at appropriate timings to the gate lines.

Any one of the first to third configurations may be further characterized in that each of the sub-gate lines has a length from the frame area where the second driving circuitry is provided to a position of the gate line corresponding to the sub-gate line (the fifth configuration).

With the fifth configuration, the number of the sub-gate lines intersecting with the gate lines can be minimized, whereby the capacitances of the gate lines can be reduced.

Any one of the first to fifth configurations may be characterized in that the active matrix substrate further includes a plurality of data lines that intersect with the gate lines and supply voltage signals indicative of image data, wherein a plurality of pixels defined by the gate lines and the data lines are formed on the active matrix substrate: each of the pixels has a light-shielding area that includes at least the gate line and the data line, as well as a non-light-shielding area that is the area other than the light-shielding area: and the sub-gate lines are arranged in the light-shielding areas of some of the plurality of pixels (the sixth configuration).

With the sixth configuration, lowering of the transmittance in the pixels ere prevented, whereby the deterioration of the display quality can be prevented, as compared with a case where the sub-gate lines are provided in the non-light-shielding areas of the pixels.

The sixth configuration may be further characterized in that the sub-gate lines are arranged in such a manner that one sub-gate line is arranged at a position overlapping with one data line when viewed in a plan view (the seventh configuration).

The sixth or seventh configuration may be further characterized in further including: a counter substrate arranged so as to be opposed to the active matrix substrate; and a liquid crystal layer interposed between the active matrix substrate and the counter substrate, wherein the counter substrate includes a light-shielding member at a position corresponding to the light-shielding areas of the active matrix substrate, and the sub-gate lines are arranged in such a manner that one sub-gate line is arranged at a position overlapping with the light-shielding member when viewed in a plan view (the eighth configuration).

The following description describes embodiments of the present invention in detail, while referring to the drawings. Identical or equivalent parts in the drawings are denoted by the same reference numerals, and the descriptions of the same are not repeated. To make the description easy to understand, in the drawings referred to hereinafter, the configurations are simply illustrated or schematically illustrated, or the illustration of a part of constituent members is omitted. Further, the dimension ratios of the constituent members illustrated in the drawings do not necessarily indicate the real dimension ratios.

Embodiment 1

FIG. 1 is a schematic cross-sectional view of a display device in the present embodiment. The display device 1 in the present embodiment includes an active matrix substrate 2, a counter substrate 3, and a liquid crystal layer 4 interposed between the active matrix substrate 2 and the counter substrate 3.

Further, though the illustration is omitted in FIG. 1, the display device 1 includes a backlight that is provided so as to extend in a surface direction of the active matrix substrate 2, on a side opposite to the liquid crystal layer 4, and a pair of polarizing plates between which the active matrix substrate 2 and the counter substrate 3 are interposed. The following description mainly describes the configuration of the active matrix substrate 2 in detail.

Figure 2:
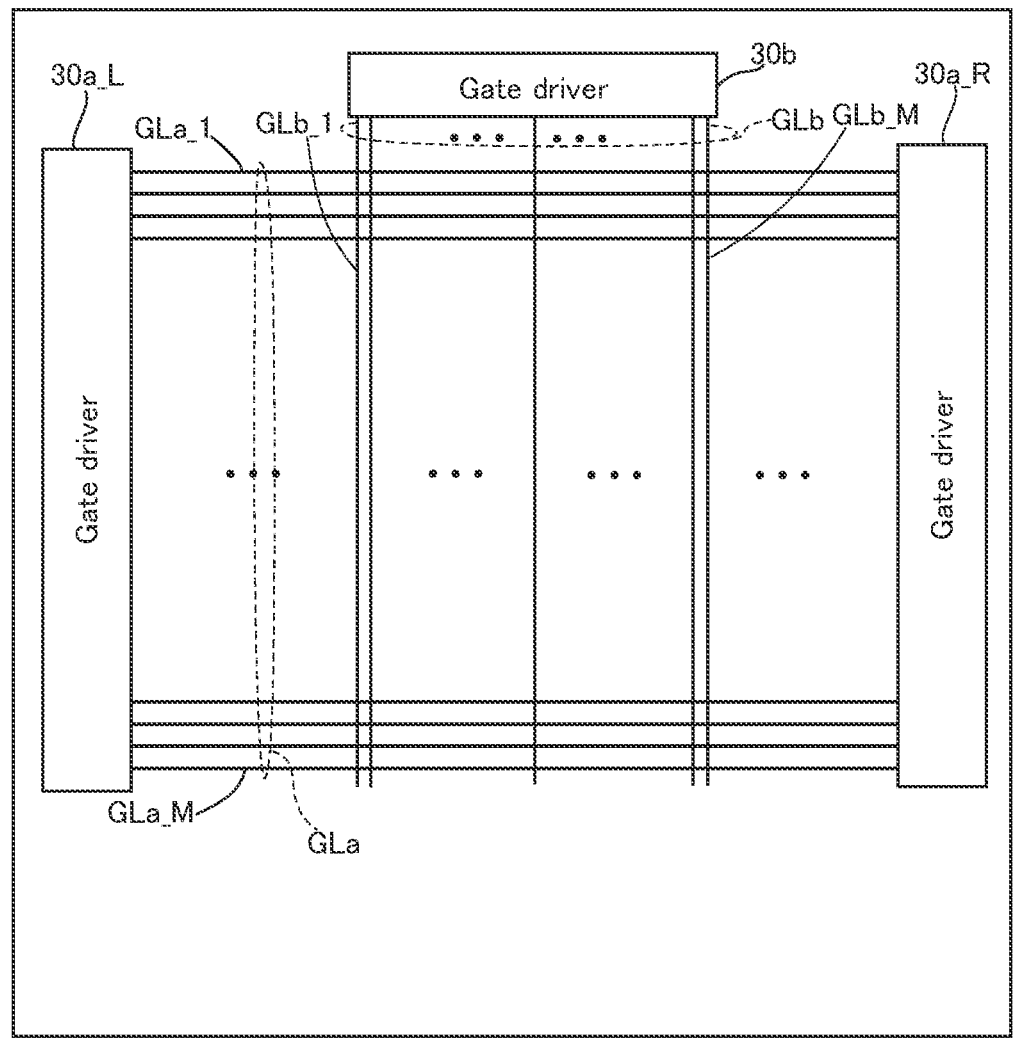
FIG. 2 is a plan view illustrating a schematic configuration of an active matrix substrate illustrated in FIG. 1.

FIG. 2 is a plan view illustrating a schematic configuration of the active matrix substrate 2. As illustrated in FIG. 2, the active matrix substrate 2 includes, as gate lines, a group GLa of M gate lines (M: a natural number equal to or more than 1) (GLa_1 to GLa_M) extending in the X axis direction. Further, the active matrix substrate 2 includes, as sub-gate lines, a group GLb of M gate lines (GLb_1 to GLb_M) extending in the Y axis direction.

The gate lines GLa_1 to GLa_M are electrically connected to the gate lines GLb_1 to GLb_M, respectively. In other words, for example, the gate line GLa_1 and the gate line GLb_1 are connected to each other, and the gate line GLa_M and the gate line GLb_M are connected to each other.

The gate line group GLa is connected with gate drivers 30a_L and 30a_R, as first driving circuitry, which are provided on both end sides of the gate line group GLa. Each of the gate drivers 30a_L and 30a_R includes M shift registers (not shown) provided in correspondence to the gate lines GLa_1 to GLa_M. The present embodiment has a monolithic structure in which the gate drivers 30a_L and 30a_R are mounted on the active matrix substrate 2, but the manner of mounting of the gate drivers 30a_L and 30a_R is not limited to this. For example, the gate drivers 30a_L and 30a_R may be attached to the active matrix substrate 2 by using tape automated bonding (TAB) or the like.

On the other hand, the gate line group GLb is connected with the gate driver 30b, as a second driving circuitry, which is provided at an end on a side in the Y axis positive direction of the gate line group GLb. The gate driver 30b includes M shift registers (not shown) provided in correspondence to the gate lines GLb_1 to GLb_M.

To each shift register of the gate drivers 30a_L, 30a_R, and 30b, a control signal for causing the shift register to operate is supplied from a controller that is not illustrated. For example, a common control signal is supplied to each shift register in the gate drivers 30a_L and 30a_R corresponding to the gate line GLa_1, and the shift register in the gate driver 30b corresponding to the gate line GLb_1. The shift registers operate in synchronization based on the control signals supplied thereto, and approximately simultaneously supply a scanning signal indicative of selection or non-selection to the respective gate lines corresponding thereto. In other words, to the gate lines GLa_n and GLb_n, the scanning signal having the same potential is supplied approximately simultaneously (n: a natural number, 1≤n≤M).

Figure 3A:
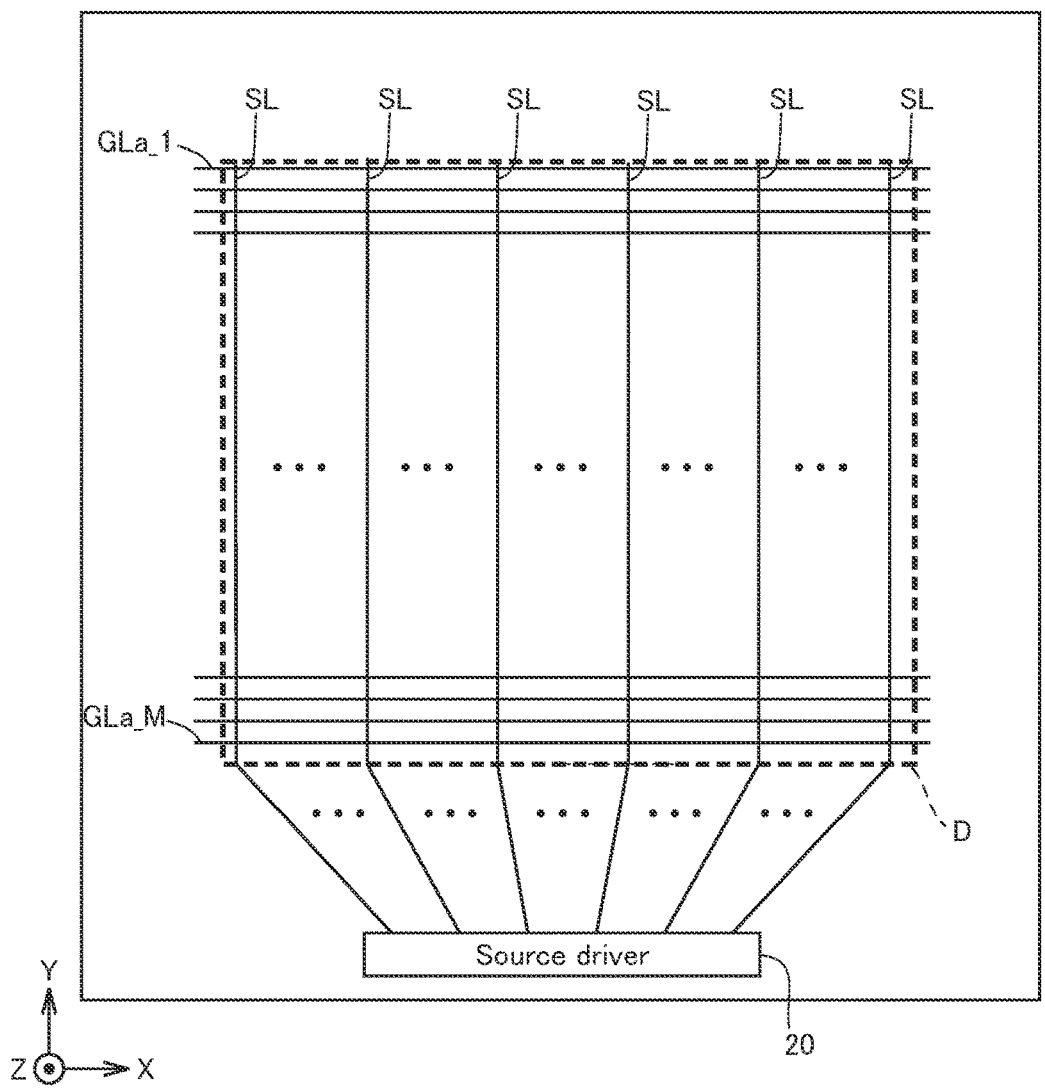
FIG. 3A is a plan view illustrating the active matrix substrate, in which the illustration of the gate drivers and the group GLb of gate lines illustrated in FIG. 2 is omitted.

Next, the following description describes other constituent members on the active matrix substrate 2. FIG. 3A is a plan view illustrating the active matrix substrate 2 in which the illustration of the gate drivers 30a_L, 30a_R, and 30b and the gate line group GLb illustrated in FIG. 2 is omitted.

As illustrated in FIG. 3A, the active matrix substrate 2 is provided with a plurality of data lines SL that extend in the Y axis direction so as to intersect with each gate line of the gate line group GLa.

A source driver 20 that supplies data signals representing image data is provided on one side of the ends of the data lines SL (on the Y axis negative direction side), on the active matrix substrate 2. Each data line SL is connected with the source driver 20.

The active matrix substrate 2 has a display area D composed of a plurality of pixels defined by the respective gate lines of the gate line group GLa and the data lines SL. An area outside the display area D on the active matrix substrate 2 is referred to as a frame area.

In the present embodiment, in parts, of the frame area on both end sides of the gate line group GLa, the gate drivers 30a_L and 30a_R (see FIG. 2) are provided, which are the first driving circuitry. Further, in one of parts of the frame area on both end sides of the gate line group GLb, the gate driver 30b (see FIG. 2) is provided, which is the second driving circuitry.

Figure 3B:
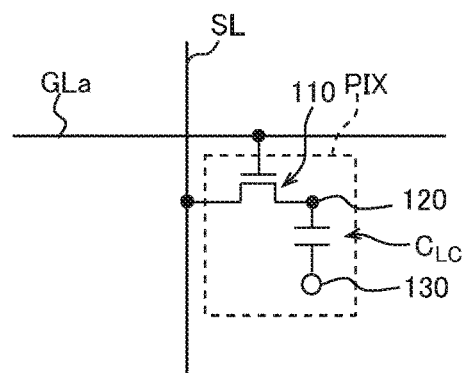
FIG. 3B is an equivalent circuit diagram illustrating one pixel.

FIG. 3B is an equivalent circuit diagram illustrating one pixel. As illustratel in FIG. 3B, the pixel PIX includes a thin film transistor (TFT) 110 and a pixel electrode 120. The TFT 110 is provided in the vicinity of the position of intersection between one gate line GLa_n and one data line SL_n. Regarding the TFT 110, the gate electrode thereof is connected with the gate line GLa, the source electrode thereof is connected with the data line SL, and the drain electrode thereof is connected with the pixel electrode 120.

The counter substrate 3 includes color filters (not shown) of the respective, colors of R, G, and B and counter electrodes (common electrodes) 130 that are provided so as to be opposed to the pixel electrodes 120. The pixel PIX includes a liquid crystal capacitor $C_{LC}$ between the pixel electrode 120 and the counter electrode 130.

The TFT 110 switches ON/OFF according to the potential of the scanning signal supplied to the gate line GLa_n. When a data signal is supplied to the data line SL_n when the TFT 110 is ON, the transmittance of the pixel PIX changes according to the voltage of the data signal.

Here, the following description describes positions in the active matrix substrate 2 at which the gate lines of the gate line group GLb are connected with the gate lines of the gate line group GLa.

Figure 4:
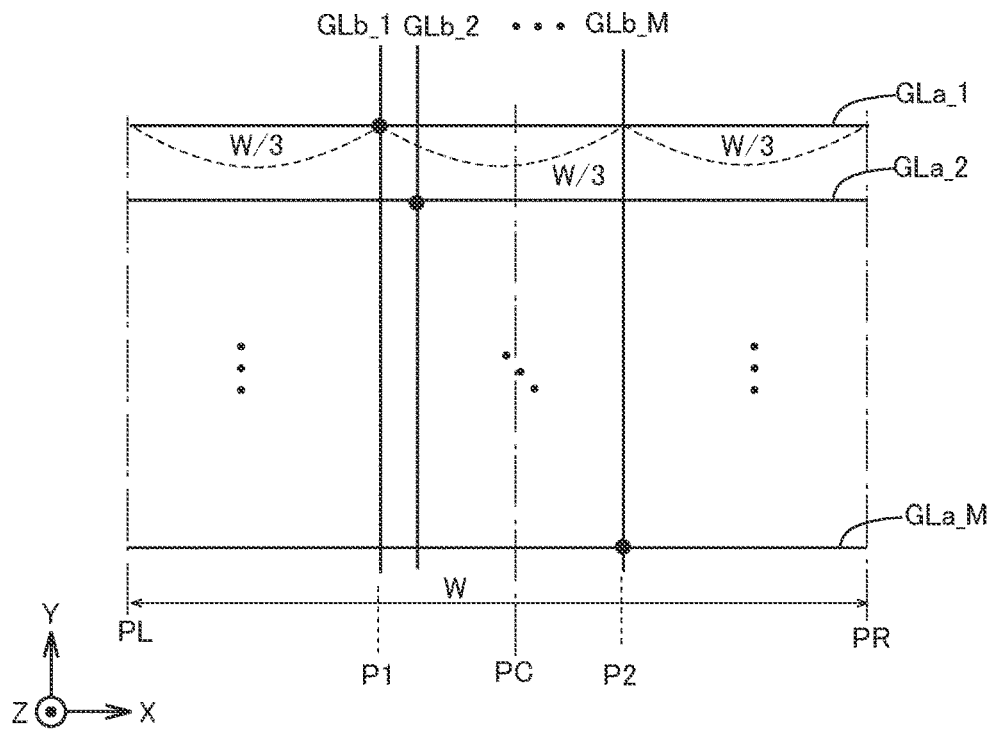
FIG. 4 schematically illustrates the positional relationship of gate line groups GLb and GLa in Embodiment 1 when viewed in a plan view.

FIG. 4 schematically illustrates the positional relationship of the gate lines of the gate line group GLb and the gate lines of the gate line group GLa when viewed, in a plan view.

As illustrated in FIG. 4, the gate lines GLb_1 to GL_M are provided between positions P1 and P2, which are positions that divide the length W of each gate line of the gate line group GLa into approximately three equal widths. More specifically, for example, the gate line GLb_1 corresponding to the gate line GLa_1 is connected with the gate line GLa_1 at the position P1 that is a length of W/3 far from one end PL of the gate line GLa_1. Further, the gate line GLb_M corresponding to the gate line GLa_M is connected with the gate line GLa_M at the position P2 that is a length of W/3 far from the other end PR of the gate line GLa_M. The other gate lines GLb_2 to GLb_M−1 are connected with the gate lines GLa_2 to GLa_M−1 corresponding thereto, in a space between the positions P1 and P2.

In other words, the gate lines of the gate line group GLb are arrayed so as to be line-symmetric with respect to the position PC approximately at the center in the extending direction of the gate lines of the gate line group GLa, and are connected to the corresponding gate lines of the gate line group GLa, respectively, within the display area D.

As described above, to the gate lines of the gate, line group GLa and the gate lines of the gate line group GLb connected with each other, the scanning signal is supplied approximately simultaneously by the gate drivers $30a\_L$, $30a\_R$, and $30b$. In other words, in FIG. 4, for example, to the gate line GLa_1, the scanning signal of the same potential is supplied from both of the ends thereof and the position P1 approximately simultaneously.

In a case where the line resistance of the gate line GLa_1 is assumed to be "R", and a capacitance thereof is assumed to be "C", the time constant of the gate line GLa_1 when the gate line is not connected therewith is assumed to be "RC", In the present embodiment, for example, to the gate line GLa_1, the scanning signal is supplied via both ends thereof and the position P1. In the gate line GLa_1, therefore, the portion where the scanning signal transmission distance is the longest is the portion between the end PR and the position P1. The length of this portion is about ⅔ of the entire length W of the gate line GLa_1, and this portion has a time constant of 4RC/9 (=2R/3×2C/3).

The gate line GLa_M is connected with the gate line GLb_M at the position P2, which is W/3 far from the end PR. In the gate line GLa_M, therefore, as is the case with the gate line GLa_1, the portion where the scanning signal transmission distance is the longest is the portion between the end PL and the position P2, and the length of this portion is about ⅔ of the entire length W thereof. The time constant of the portion where the scanning signal transmission distance is the longest in the gate line GLa_M is also 4RC/9.

In the gate line group GLa, the gate lines other than the gate lines GLa_and GLa_M are connected with the corresponding gate lines of the gate line group GLb, in the space between the positions P1 and P2. In the gate lines other than the gate lines GLa_1 and GLa_M among the gate lines of the gate line group GLa, therefore, the length of the portion where the scanning signal transmission distance is the longest is smaller than those of the gate lines GLa_1 and GLa_M. The time constant of this portion, therefore, is smaller than 4RC/9.

As described above, in the present embodiment, the gate lines of the gate line group GLb are connected to the gate lines of the gate line group GLa so as to have a time constant that is equal to or less than ½ of the time constant (RC) of the gate lines of the gate line group GLa in the case where the scanning signal is supplied via only both ends of the gate lines of the gate line group GLa. With such a configuration, as compared with the case where the gate line group GLb is not provided, it is not likely that delays would occur to the scanning signal, resulting in that high-speed driving of the gate line group GLa is enabled.

Figure 5:
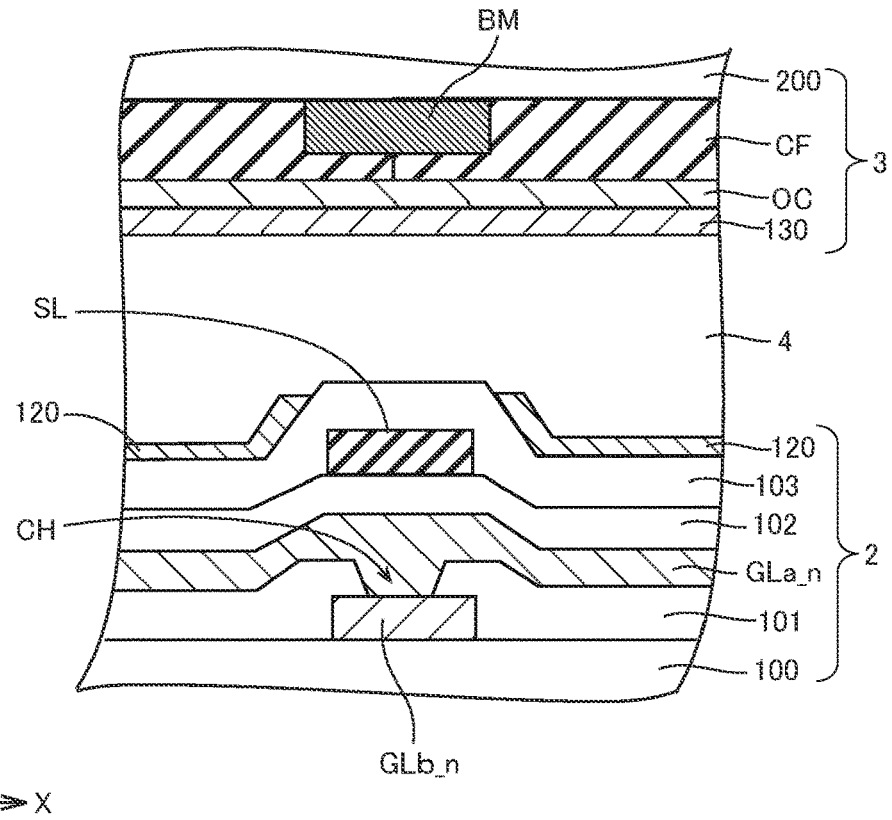
FIG. 5 is a cross-sectional view of the display device illustrated in FIG. 1, illustrating the positional relationship in the vertical direction of the gate line groups GLb and GLa.

Here, an exemplary arrangement of the gate line of the gate line group GLb within the pixel is described. FIG. 5 is a cross-sectional view of the display device 1, illustrating the positional relationship in the vertical direction of the gate lines of the gate line group GLb and the gate lines of the gate line group GLa.

As illustrated in FIG. 5, the active matrix substrate 2 includes the gate line GLb_n (n: a natural number, 1≤n≤M) on a substrate 100 having translucency.

An insulating film, 101 is arranged on the substrate 100, with the gate line GLb_n being interposed therebetween where the gate line GLb_n is provided, and the insulating film 101 has a contact hole CH on the gate line GLb_n.

The gate line GLa_n is arranged on the insulating film 101, and is connected with the gate line GLb_n via the contact hole CH. The gate line GLa_n and the gate line GLb_n may be formed with the same conductive material, or may be formed with different conductive materials.

A gate insulating film 102 is arranged on the gate line GLa_n and the data line SL is arranged at a position on the gate insulating film 102 that overlaps with the gate line GLb_n.

An insulating film 103 is arranged on the gate insulating film 102 so as to cover the data line SL.

The pixel electrode 120 is arranged on the insulating film 103, at a position that does not overlap with the data line SL.

The liquid crystal layer 4 is provided on the active matrix substrate 2, and the counter substrate 3 is provided on the liquid crystal layer 4.

The counter substrate 3 includes a substrate 200 having translucency, and a black matrix BM on a liquid crystal layer 4 side surface of the substrate 200, at a position that overlaps with the data line SL.

Further, the counter substrate 3 includes color filters CF that cover the black matrix BM, each color filter being provided at a position that overlaps with the pixel electrode 120, and correspond to any one of the colors of R, G, and B.

Additionally, an overcoat layer OC is provided so as to cover the color filters CF, and a counter electrode 130 is provided so as to cover the overcoat layer OC.

In this way, the gate lines of the gate line group GLb are provided at positions that overlap with the data lines SL and the black matrix BM. In other words, each gate line of the gate line group GLb is provided at a position between the pixels so as not to deteriorate the aperture ratio of the pixels.

Embodiment 2

Embodiment 1 described above is described with reference to an example in which to the gate line group GLb, the scanning signal is supplied from one end side thereof. The present embodiment is described with reference to an example in which the scanning signal is supplied from ends on the both sides of the gate line group GLb.

Figure 6:
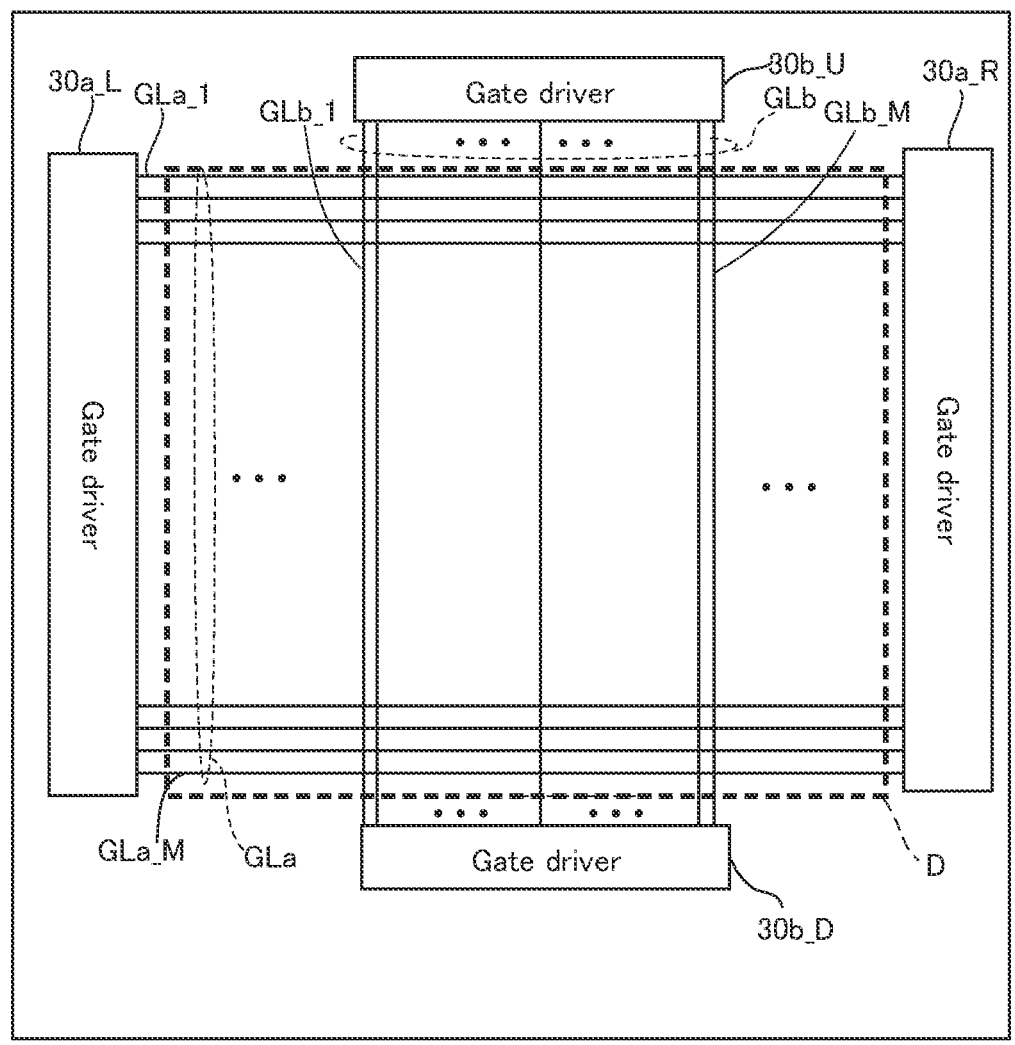
FIG. 6 is a plan view illustrating a schematic configuration of an active matrix substrate in Embodiment 2.

FIG. 6 is a plan view illustrating a schematic configuration of an active matrix substrate 2a in the present embodiment. In this drawing, the illustration of the data lines SL and the source driver 20 is omitted. Besides, in FIG. 6, the same constituent members as those in Embodiment 1 are denoted by the same reference symbols as those in Embodiment 1.

As illustrated in FIG. 6, in the present embodiment, gate drivers $30b\_D$ are provided on the active matrix substrate $2a$, in a frame area on the Y axis negative direction side, of the frame areas on the both end sides of the gate line group GLb. Further, as is the case with Embodiment 1, a gate driver $30b\_U$ is provided in a frame area on the V axis positive direction side, of the frame areas on both end sides of the gate line group GLb.

Each of the gate driver $30b\_D$ and the gate driver $30b\_U$ includes shift registers corresponding to the gate lines of the gate line group GLb, respectively. To the shift register in the gate driver $36b\_D$ and the shift register in the gate driver $33b\_U$ that correspond to the same gate line, a common control signal is supplied from a controller (not shown), and these shift registers supply a scanning signal having the same potential approximately simultaneously to the gate line.

In the case of Embodiment 1, scanning signal delay tends to occur in the gate line of the gate line group GLb connected to the gate line of the gate line group GLa that is farthest from the gate driver $30b$. In contrast, in a case where the scanning signal is supplied from ends on both sides of the gate line group GLb as is the case with Embodiment 2, it is unlikely that scanning signal delay would occur in each gate line of the gate line group GLb. As a result, this makes it possible to supply the scanning signal to the gate line group GLa at appropriate timings via the gate line group GLb.

Further, even if either one of the gate drivers 30b_D and 30b_U does not work, the gate line group GLb can be driven by the other gate driver, whereby the reliability can be improved.

Embodiment 3

As Embodiment 1 described above, an example is described in which the gate lines of the gate line group GLa and the gate lines of the gate line group GLb are connected in one-to-one correspondence within the display area D. As the present embodiment, an example is described in which the gate lines of the gate line group GLa and the gate lines that intersect at right angles with the gate line group GLa extending direction are connected within the display area D in such a manner that two of the latter gate lines are connected to one former gate line.

Figure 7:
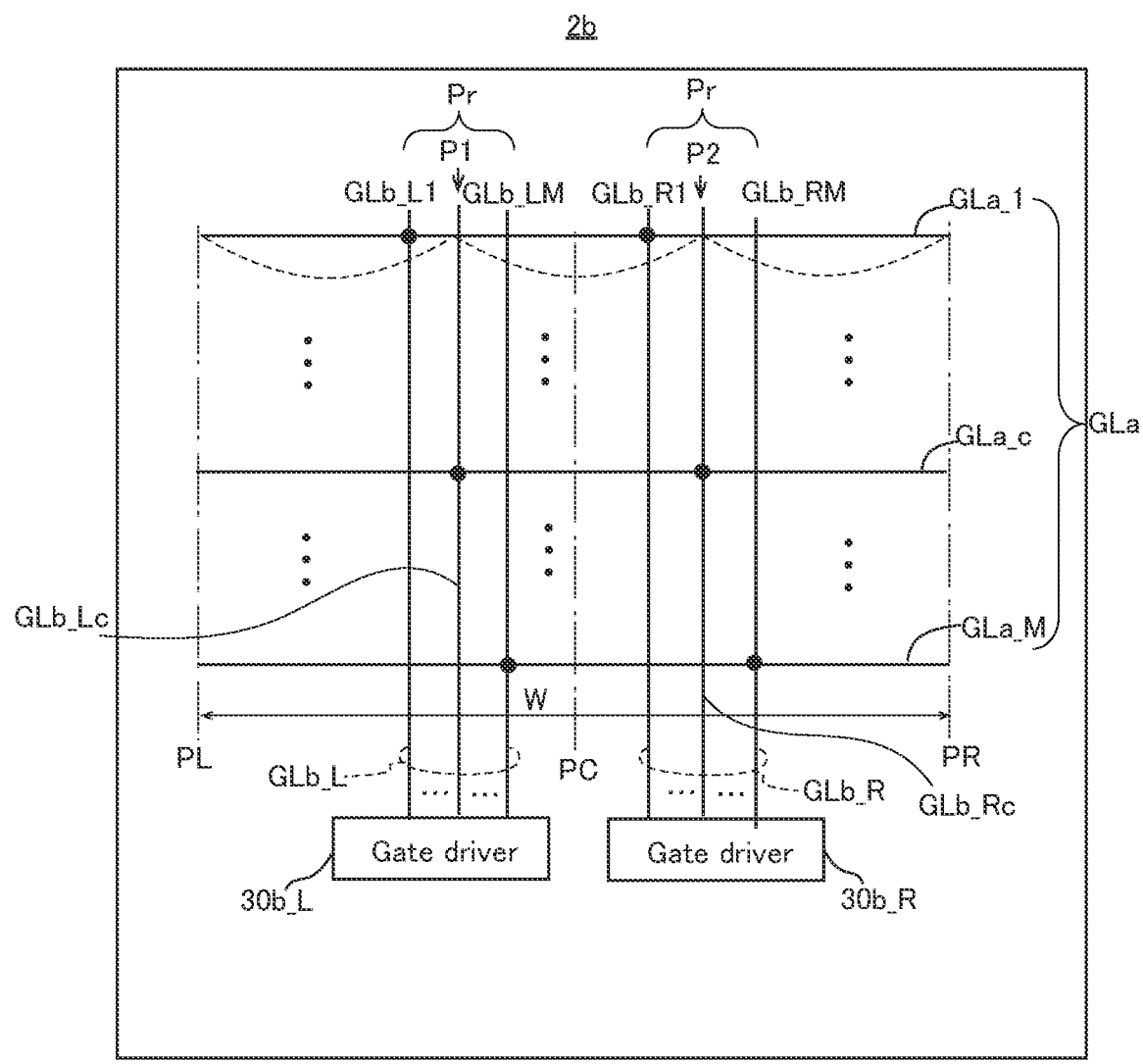
FIG. 7 is a plan view illustrating a schematic configuration of an active matrix substrate in Embodiment 3.
Figure 7:
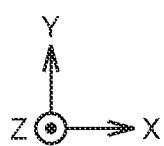

FIG. 7 schematically illustrates a schematic configuration of an active matrix substrate 2b in the present embodiment. In this drawing, the illustration of the gate drivers 30a_L and 30a_R that drive the gate line group GLa, the data lines SL, and the source driver 20, is omitted. Further, in FIG. 7, the same constituent members as those in Embodiment 1 are denoted by the same reference symbols as those in Embodiment 1.

As illustrated in FIG. 7, the active matrix substrate 2b includes a gate line group GLa, as well as a gate line group GLb_L and a gate line group GLb_R that extend in the Y axis direction, as a first sub-gate line group and a second sub gate line group, respectively.

The gate line group GLb_L includes M gate lines GLb_L1 to LM that correspond to the gate lines of the gate line group GLa, respectively. The gate line group GLb_R includes M gate lines GLb_R1 to RM that correspond to the gate lines of the gate line group GLa, respectively.

The gate line group GLb_L is connected with the gate driver 30b_L, which is provided in a frame area on the Y axis negative direction side. The gate line group GLb_R is connected with the gate driver 30b_R, which is provided in a frame area on the Y axis negative direction side.

The gate driver 30b_L includes shift registers corresponding to the gate lines GLb_L1 to LM, respectively. The gate driver 30b_R includes shift registers corresponding to the gate lines GLb_R1 to RM, respectively.

The gate lines (GLb_L1 to LM) of the gate line group GLb_L are connected with the gate lines GLa_1 to GLa_M, respectively, in a range Pr that contains a position P1 in the X axis direction of the gate line group GLa.

The gate lines (GLb_R1 to GLb_RM) of the gate line group GLb_R are connected with the gate lines GLa_1 to GLa_M, respectively, in a range Pr that contains a position P2 in the X axis direction of the gate line group GLa.

The gate line GLb_Lc arranged approximately at the center in the X axis direction, in the gate line group GLb_L, is connected with the corresponding, gate line GLa_c in the gate line group GLa, at the position P1. The other gate lines in the gate line group GLb_L are arranged dispersedly so as to be horizontally symmetric with respect to the position P1.

The gate line GLb_Rc arranged approximately at the center in the X axis direction, in the gate line group GLb_R, is connected with the gate line GLa_c, at the position P2. The other gate lines in the gate line group GLb_R are arranged dispersedly so as to be horizontally symmetric with respect to the position P2.

In other words, the gate line groups GLb_L and GLb_R are arranged so as to be line-symmetric with respect to the position PC approximately at the center in the gate line group GLa extending direction, and are connected with the gate line group GLa within the display area D.

To the shift registers of the gate driver 30b_L and the gate driver 30b_R, which respectively correspond to the gate lines GLb_Ln of the gate line group GLb_L and the gate lines GLb_Rn of the gate line group GLb_R, which are connected with the gate lines GLa_n, a common control signal is supplied, whereby these shift registers operate in synchronization.

As described above, the position P1 in the X axis direction of a gate line of the gate line group GLa is W/3 far from one end PL of the foregoing gate line, and the position P2 is W/3 far from the other end PR of the foregoing gate line.

In the present embodiment, to each gate line of the gate line, group GLa, a scanning signal is supplied, within a predetermined range Pr that is determined with reference to both ends thereof and the positions P1 and P2. In one of the gate lines of the gate line group GLa, a portion thereof having the longest scanning signal transmission distance has a length of W/3+Δd. Here, Δd represents the length of a portion from the position P1 to the gate line GLb_LM, or the length of a portion from the position P2 to the gate line GLb_R1, in FIG. 7. In the gate line group GLa, therefore, the portion having the longest scanning signal transmission distance, therefore, has a length of about W/3, which is shorter than that in the case of Embodiment 1. It is therefore more unlikely that delays would occur to the scanning signal in the gate line group GLa, and this makes it possible to drive the gate line group GLa at a higher speed.

Embodiment 4

Embodiment 3 described above is described with reference to an example in which a scanning signal is supplied to each gate line of the gate line group GLb_L and the gate line group GLb_R, via an end thereof on one side. The present embodiment is described with reference to an example in which a scanning signal is supplied to each gate line of the gate line group GLb_L and the gate line group GLb_R, via ends thereof on both sides.

Figure 8:
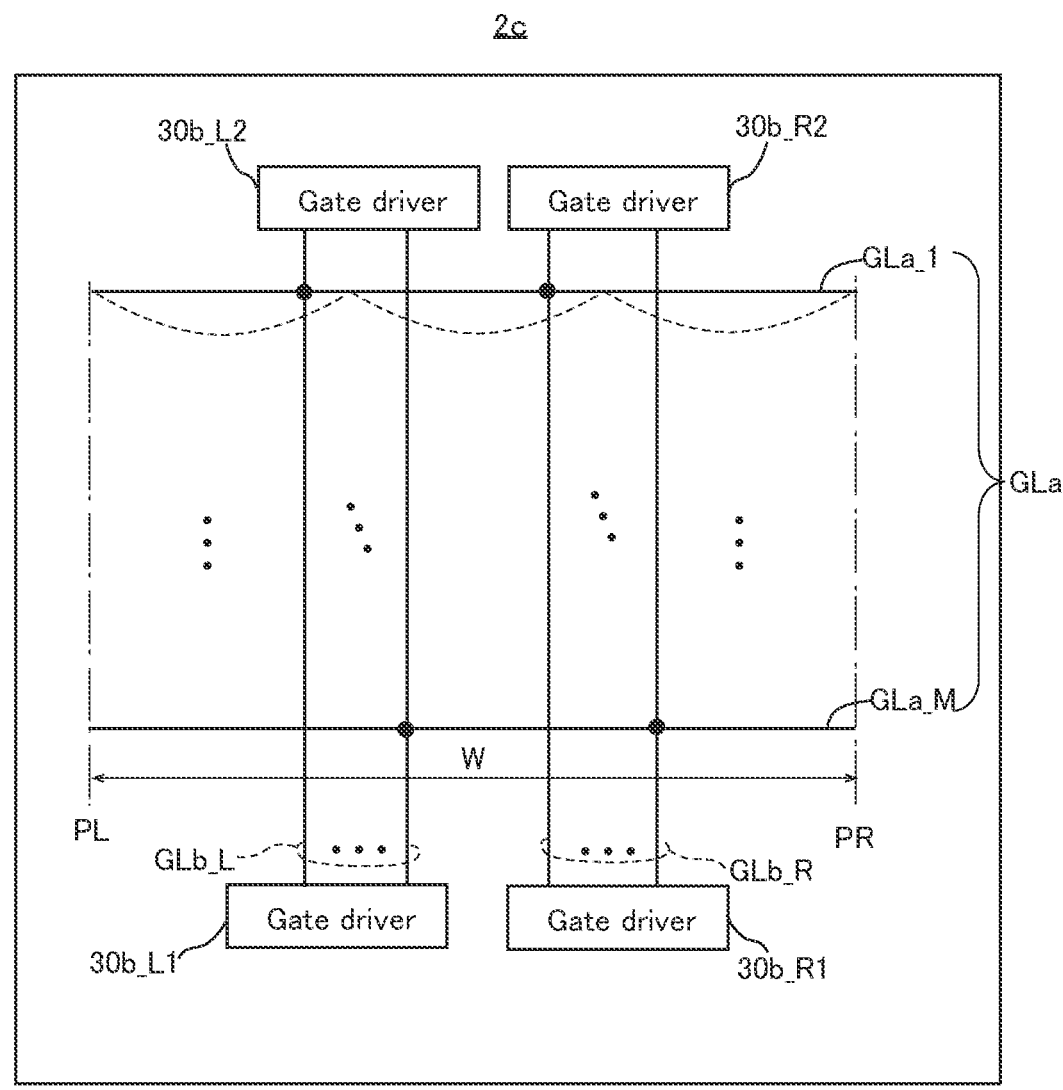
FIG. 8 is a plan view illustrating a schematic configuration of an active matrix substrate in Embodiment 4.

FIG. 8 schematically illustrates a schematic configuration of an active matrix substrate in the present embodiment. In this drawing, the illustration of the gate drivers 30a_L and 30b_R that drive the gate line group GLa, the data lines SL, and the source driver 20 is omitted. Besides, in FIG. 8, the same constituent members as those in Embodiment 3 are denoted by the same reference symbols as those in Embodiment 3.

As illustrated in FIG. 8, on the active matrix substrate 2c, gate drivers 30b_L1 and 30b_R1 are provided in a frame area on the Y axis negative direction side, and gate drivers 30b_L2 and 30b_R2 are provided in a frame area on the Y axis positive direction side.

Each of the gate driver 30b_L1 and the gate driver 30b_L2 includes shift registers corresponding to the gate lines of the gate line group GLb_L, respectively. Each of the gate driver 30b_R1 and the gate driver 30b_R2 includes shift registers corresponding to the gate lines of the gate line group GLb_R, respectively.

In the gate drivers 30b_L1 and 30b_L2, a common control signal is supplied from a controller (not illustrated) to the shift registers corresponding to the same gate line, and the shift registers supply a scanning signal having the same potential to the gate line approximately simultaneously.

In the gate drivers 30b_R1 and 30b_R2, a common control signal is supplied to the shift registers corresponding to the same gate line, and the shift registers supply a scanning signal having, the same potential to the gate line approximately simultaneously.

With this configuration, it is unlikely that the scanning signal in the gate line groups GLb_L and GLb_R would become dull, as compared with a case where the scanning signal is supplied from, ends on one side of the gate line groups GLb_L and GLb_R. As a result, this makes it possible to supply the scanning signal to the gate line group GLa at appropriate timings via the gate line groups GLb_L and GLb_R. Further, since each of the gate line groups GLb_L and GLb_R is scanned by two gate drivers, the reliability can be enhanced as compared with a case where they are scanned by one gate driver each.

Exemplary display devices according to the present invention are described above, but the configuration of the display device according to the present invention is not limited to the configurations of the above-described embodiments, and the configuration can be varied in many ways. Modification examples of the same are described below.

(1) The gate line group GLb in Embodiment 1 described above has such a length that the gate lines intersect with all of the gate lines of the gate line group GLa. Each gate line of the gate line group GLb in the present modification example has such a length as to reach the position of the gate line of the gate line group GLa corresponding to the foregoing gate line. The following description describes the modification example in detail.

Figure 9:
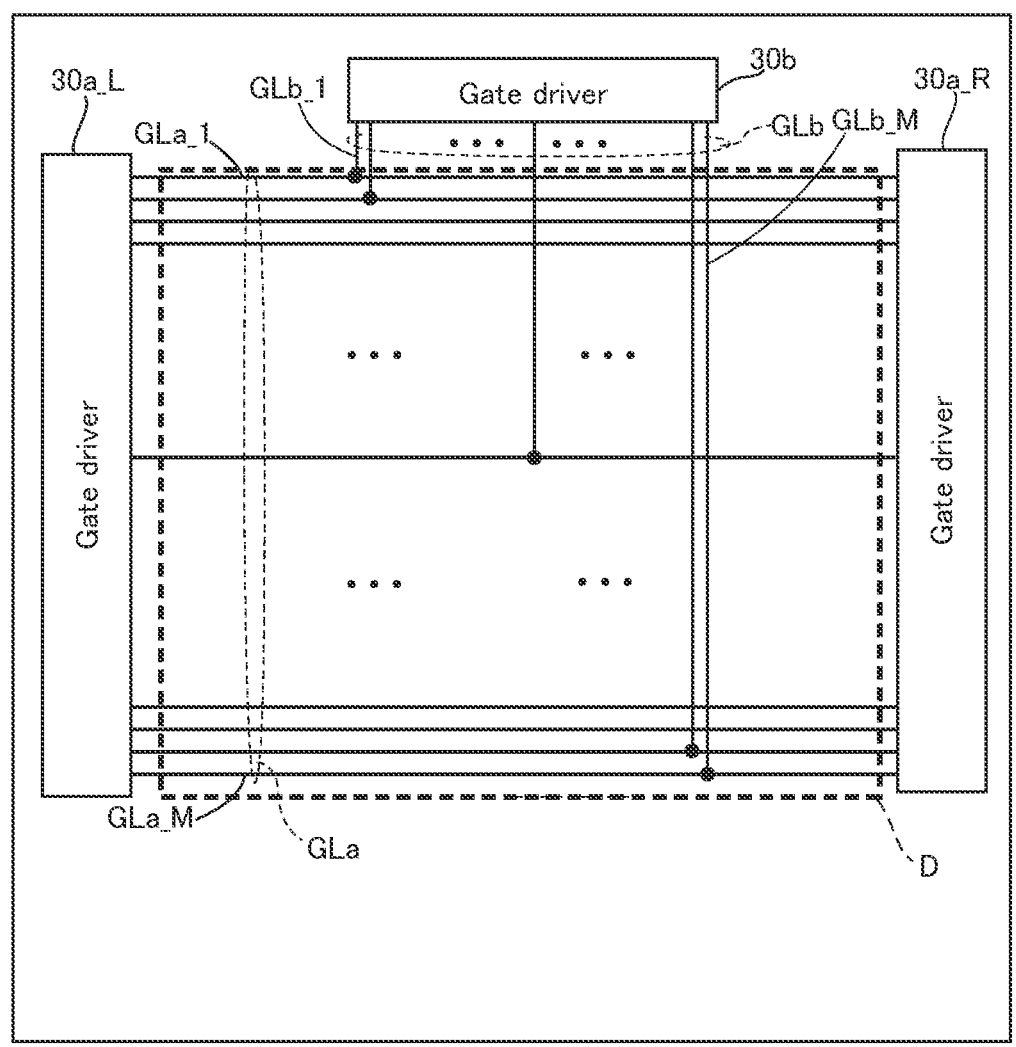
FIG. 9 is a plan view illustrating a schematic configuration of an active matrix substrate in Modification Example (1).

FIG. 9 is a plan view illustrating a schematic configuration of an active matrix substrate in the present modification example. In this drawing, the illustration of the data lines SL and the source driver 20 is omitted. Besides, in FIG. 9, the same constituent members as those in Embodiment 1 are denoted by the same reference symbols as those in Embodiment 1. The following description describes points different from those in Embodiment 1.

As illustrated in FIG. 9, on the active matrix substrate 2d, the gate line group GLb is led out of the gate driver 30b toward a display area D, the gate driver 30b being arranged outside the display area D, in a frame area on the Y axis positive direction side.

Each gate line of the gate line group GLb is extended to one of the gate lines of the gate line group GLa corresponding to the foregoing gate line, that is, the gate line to be connected with the foregoing gate line. More specifically, the gate line GLb_1 is extended from the gate driver 30b to the gate line GLa_1, and is connected with the gate line GLa_1. Further, the gate line GLb_2 is extended from the gate driver 30b to the gate line GLa_2, and is connected with the gate line GLa_2. Still further, the gate line GLb_M is extended from the gate driver 30b to the gate line GLa_M, and is connected with the gate line GLa_M.

In this way, in the present modification example, each gate line of the gate line group GLb is extended only to a position where a gate line to be connected therewith is provided. The gate lines other than the gate line GLb_M, therefore, do not intersect with all of the gate lines of the gate line group GLa.

With this configuration, the number of the gate lines of the gate line group GLb intersecting with each gate line of gate line group GLa can be reduced, and the capacitance of each gate line of the gate line group GLa can be reduced.

(2) Modification Example (1) described above is described with reference to an example in which all of the gate lines of the gate line group GLb are driven by the gate driver 30b provided on one end side of the gate line group GLb. In this case, as the scanning signal transmission distance from the gate driver 30b is longer, the scanning signal becomes duller, and scanning signal delays tend to occur. The present modification example is described with reference to a configuration example in which it is less likely that scanning signal delays would occur in the gate line group GLb, as compared with Modification Example (1).

Figure 10:
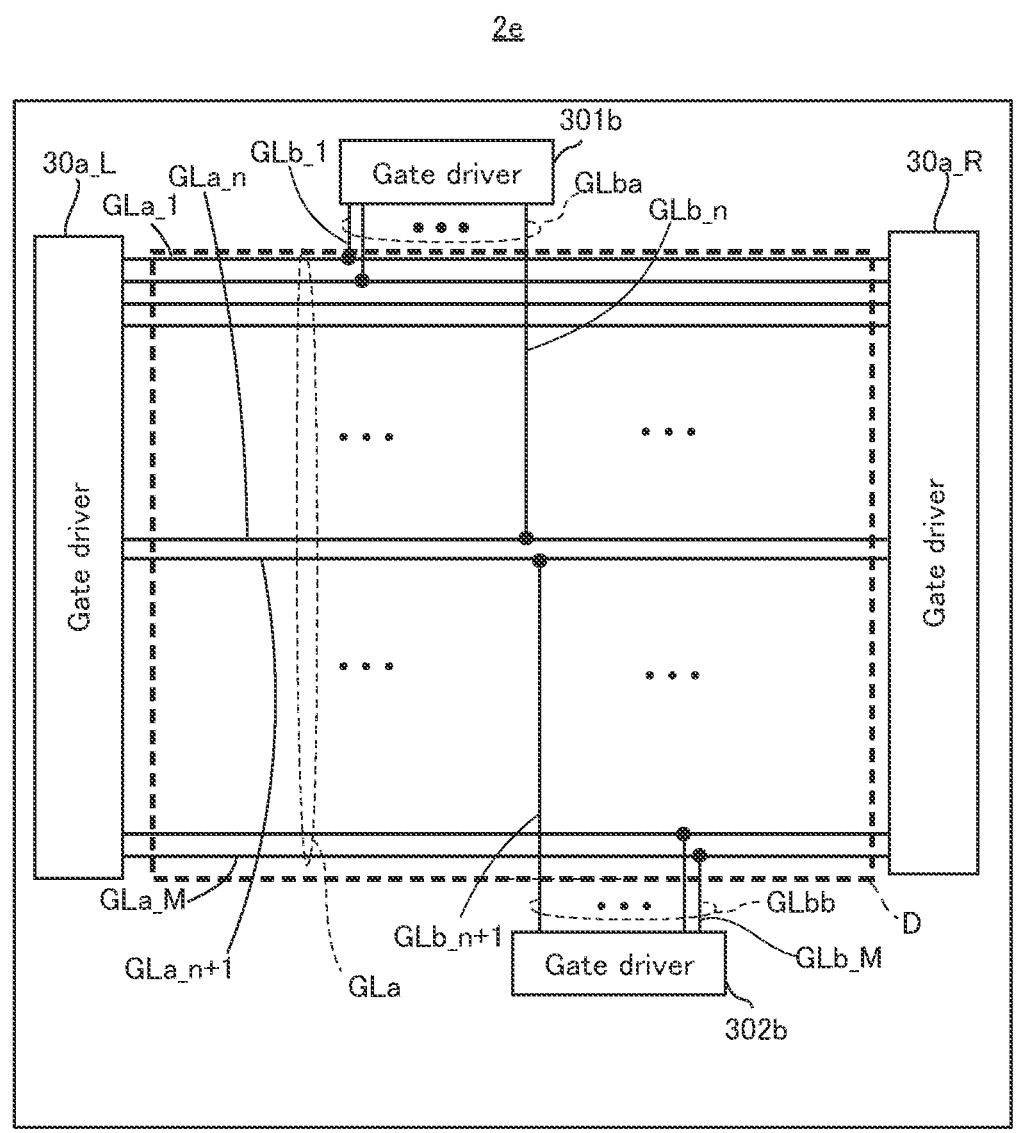
FIG. 10 is a plan view illustrating a schematic configuration of an active matrix substrate in Modification Example (2).

FIG. 10 is a plan view illustrating a schematic configuration of an active matrix substrate in the present modification example.

As illustrated in FIG. 10, the active matrix substrate 2e includes a gate line group GLba corresponding to gate lines to GLa_1 to GLa_n, and a gate line group GLbb corresponding to gate lines GLa_n+1 to GLa_M.

Further, the active matrix substrate 2e includes a gate driver 301b provided in a frame area on the Y axis positive direction side, and a gate driver 302b provided in a frame area on the Y axis negative direction side.

The gate line group GLba includes gate lines to GLb_1 to GLb_n. Each of the gate lines GLb_1 to GLb_n is led out of the gate driver 301b, and is extended to one of the gate lines in the gate line group GLa to be connected therewith.

The gate line group GLbb includes gate lines GLb_n+1 to GLb_M. Each of the gate lines GLb_n+1 to GLb_M is led out of the gate driver 302b, and is extended to one of the gate lines in the gate line group GLa to be connected therewith.

The gate driver 301b includes shift registers that drive the gate lines GLb_1 to GLb_n, respectively. In the gate driver 301b, and the gate drivers 30a_L and 30a_R, a common control signal is supplied to the shift registers that are in such relationship that the respective gate lines as targets to be driven by these shift registers are connected with one another, whereby these shift registers are caused to operate in synchronization.

Further, the gate driver 302b includes shift registers that drive the gate lines GLb_n+1 to GLb_M, respectively. In the gate driver 302b, and the gate drivers 30a_L and 30a_R, a common control signal is supplied to the shift registers that are in such relationship that the respective gate lines as targets to be driven by these shift registers are connected with one another, whereby these shift registers are caused to operation in synchronization.

In the present modification example, the gate line group GLba, which is connected with part of the gate lines of the gate line group GLa, is driven by the gate driver 301b provided in a frame area on the Y axis positive direction side. Further, the gate line group GLbb, which is connected with the other gate lines of the gate line group GLa, is driven by the gate driver 302b provided in a frame area on the Y axis negative direction side. Every line of the gate line groups GLba and GLbb is shorter than a width in the Y axis direction of a range where the gate line group GLa is provided, and does not intersect with all of the gate lines of the gate line group GLa. As compared with Modification Example (1), it is therefore less likely that scanning signal delays would occur.

(3) The above-described embodiments are described with reference to an example of a display device in which liquid crystal is used, but any of the configurations of the above-described embodiments may be applied to a display device in which organic electroluminescence (EL) is used.

DESCRIPTION OF REFERENCE NUMERALS

1: display device
2, 2a to 2e: active matrix substrate

3: counter substrate
4: liquid crystal layer
20: source driver
30a_L, and 30a_R, 30b, 30b_L, 30b_R, 30b_L1, 30b_L2, 30b_R1, 30b_R2, 30b_D,
30b_U, 301b, 302b: gate driver
110: TFT
120: pixel electrode
130: counter electrode (common electrode)
GLa, GLb, GLb_L, GLb_R: gate line group
SL: data line
BM: black matrix

The invention claimed is:

1. A display device comprising an active matrix substrate, wherein the active matrix substrate includes:
a plurality of gate lines;
a plurality of sub-gate lines that are provided in such a manner that one or more sub-gate lines are provided with respect to each of the gate lines, the sub-gate lines extending in a direction that intersects at right angles with a direction in which the gate lines extend;
first driving circuitry that is provided in a frame area and scans the gate lines; and
a second driving circuitry that is provided in the frame area and scans the sub-gate lines,
wherein each of the sub-gate lines is connected with the gate line corresponding thereto in a display area,
the first driving circuitry supplies a scanning signal to each of the gate lines via both ends of the gate line, and
the second driving circuitry includes n driving circuits (n is a natural number) that supply the scanning signal to each of the sub-gate lines, via at least one end of the sub-gate line.

2. The display device according to claim 1, wherein the sub-gate lines are arrayed in the direction in which the gate lines extend so as to be line-symmetric with respect to a position that is approximately center in a length of the gate lines.

3. The display device according to claim 1, wherein the plurality of sub-gate lines include a plurality of sub-gate lines of a first sub-gate line group and a plurality of sub-gate lines of a second sub-gate line group,
each of the gate lines is connected with the sub-gate lines in such a manner that each gate line is connected with one of the sub-gate lines of the first sub-gate line group, and with one of the sub-gate lines of the second sub-gate line group, within the display area,
the second driving circuitry supplies the scanning signal to each sub-gate line in the first sub-gate line group and the second sub-gate line group, via at least an end thereof on one side, and
the first sub-gate line group and the second sub-gate line group are arranged extending along the direction in which the gate lines extend, so as to be line-symmetric with respect to a position that is approximately center in a length of the gate lines.

4. The display device according to claim 1
wherein the n is 2,
the second driving circuitry includes a first driving circuit and a second driving circuit, the first driving circuit and the second driving circuit corresponding to each of the sub-gate lines,
the first driving circuit supplies the scanning signal to each corresponding sub-gate line via one end thereof, and
the second driving circuit supplies the scanning signal to each corresponding sub-gate line via the other end thereof.

5. The display device according to claim 1, wherein each of the sub-gate lines has a length from the frame area where the second driving circuitry is provided to a position of the gate line corresponding to the sub-gate line.

6. The display device according to claim 1, wherein the active matrix substrate further includes:
a plurality of data lines that intersect with the gate lines and supply voltage signals indicative of image data,
wherein a plurality of pixels defined by the gate lines and the data lines are formed on the active matrix substrate,
each of the pixels has a light-shielding area that includes at least the gate line and the data line, as well as a non-light-shielding area that is the area other than the light-shielding area, and
the sub-gate lines are arranged in the light-shielding areas of some of the plurality of pixels.

7. The display device according to claim 6, wherein the sub-gate lines are arranged in such a manner that one sub-gate line is arranged at a position overlapping with one data line when viewed in a plan view.

8. The display device according to claim 6, further comprising:
a counter substrate arranged so as to be opposed to the active matrix substrate; and
a liquid crystal layer interposed between the active matrix substrate and the counter substrate,
wherein the counter substrate includes a light-shielding member at a position corresponding to the light-shielding areas of the active matrix substrate, and
the sub-gate lines are arranged in such a manner that one sub-gate line is arranged at a position overlapping with the light-shielding member when viewed in a plan view.

* * * * *